United States Patent [19]

Raaijmakers

[11] Patent Number: 4,991,017
[45] Date of Patent: Feb. 5, 1991

[54] RECEIVER FOR TELEVISION AND TELETEXT SIGNALS, INCLUDING A TELETEXT DECODER AND AN ADAPTIVE WAITING TIME REDUCTION CIRCUIT

[75] Inventor: Thomas A. M. Raaijmakers, Goirle, Netherlands

[73] Assignee: U.S. Philips Corporation, New York, N.Y.

[21] Appl. No.: 460,461

[22] Filed: Jan. 3, 1990

[30] Foreign Application Priority Data

Jan. 19, 1989 [NL] Netherlands ............... 8900121

[51] Int. Cl.$^5$ ............................................. H04N 7/08
[52] U.S. Cl. ...................................... 358/147; 358/146
[58] Field of Search ....................... 358/142, 146, 147

[56] References Cited

U.S. PATENT DOCUMENTS 4,701,794 10/1987 Froling et al. ................. 358/147
4,894,714 1/1990 Christis .................... 358/147 X

FOREIGN PATENT DOCUMENTS 0118950 9/1984 European Pat. Off. .
0220763 6/1987 European Pat. Off. .
3623925 1/1988 Fed. Rep. of Germany ...... 358/147

Primary Examiner—Victor R. Kostak
Attorney, Agent, or Firm—William Squire

[57] ABSTRACT

A television receiver or video recorder includes a multipage teletext, a programmed control and a non-volatile page number memory with which their teletext pages with their corresponding page numbers are stored in a page number memory. The numbers of frequently consulted pages are automatically stored in the page number memory with reference to the pattern of use, i.e., frequency of use. The number of each requested page is stored in the page number memory. The oldest page number or, if the entered number is already stored, the duplicate identical page number is removed from the memory. The page number memory then always comprises the most recently requested page numbers.

20 Claims, 4 Drawing Sheets

RECEIVER FOR TELEVISION AND TELETEXT SIGNALS, INCLUDING A TELETEXT DECODER AND AN ADAPTIVE WAITING TIME REDUCTION CIRCUIT

BACKGROUND OF THE INVENTION

1. Field of the invention

The invention relates to a receiver for television and teletext signals, including a teletext decoder which provides the possibility of searching a plurality of teletext pages and storing them in a page memory. The receiver also includes a page number memory in which the desired teletext page numbers are preferably stored when the receiver is switched off.

Such a receiver may be, for example a television receiver or a video recorder.

2. Description of the prior art

A television receiver or video recorder including a teletext decoder is generally provided with a (remote) control system with which the user can switch on the teletext operating state and with which he can subsequently search pages by generating the desired page numbers with the aid of numbered keys. The instructions given by the user are applied to a control circuit which interprets these instructions and passes them on to a teletext decoder. Inter alia, the page with the page number stated can be searched by the decoder, stored in a page memory and displayed on a display screen. Since the teletext pages are cyclically transmitted and since such a cycle lasts a relevant period, it may take some time before the desired page appears on the display screen.

By taking certain measures, this waiting time can be reduced considerably. For example, it is proposed in reference [1] to store the pages transmitted in the cycle in their order of reception in a memory. After a page has been requested by the user, the decoder searches for the presence of this page in the page memory. Large memories are required for this purpose because a considerable reduction of the waiting time can only be realised if the page memory comprises at least an essential number of the teletext pages transmitted in the cycle. Such large memories are, however, relatively expensive.

To meet this problem, teletext decoders have been developed which can search and store a limited but relevant number of pages and which comprise registers stating the page numbers to be searched. An example of such a decoder has been described in reference [2]. In these types of teletext decoders, which will hereinafter be referred to as multipage teletext decoders, the waiting time reduction is achieved by filling the registers as well as possible in conformity with the pages to be actually displayed. To this end it is proposed in reference [3] to store a series of page numbers stated by the user in a page number memory for a later successive display of these pages. Such a television receiver is notably very satisfactory if the number of pages which the multipage teletext decoder can store is relatively small, for example smaller than the number of stored page numbers. In fact, the waiting time is effectively reduced because the multipage teletext decoder searches, for example, the first four pages of the pages qualifying for display. A non-volatile page number memory is preferably used so that the stored page numbers are also preserved after the receiver is switched off.

The said receiver has the drawback that the user must explicitly store the numbers of the pages to be displayed in the page number memory. This means that he enters the numbers intentionally in a desired sequence and that he generates special control instructions, for example terminating a page number by means of a store key. The receiver also has the drawback that the page number memory may get filled up whereafter the further entry of page numbers is no longer possible. Furthermore the pages are displayed in their sequence of storage so that for the display of a given desired page a plurality of pages which is irrelevant at that moment must be glanced through by operating a recall key. The ease of operation of this known receiver is therefore found to be a drawback in practice.

OBJECT AND SUMMARY OF THE INVENTION

It is an object of the invention to realise, inter alia a receiver for television and teletext signals, including a multipage teletext decoder and a page number memory providing improved ease of operation and a considerable reduction of the waiting time.

According to the invention, an order of precedence is to this end assigned to the page numbers in the page number memory, which order of precedence is related to the sequence in which these page numbers are generated by the operating system. More particularly, the control circuit is adapted to assign the most recent order of precedence to a page number generated by the operating system when this page number is stored, and to adapt the orders of precedence of the other page numbers in the page number memory, the page number having the oldest order of precedence generally being removed from the page number memory if the memory is full.

It is achieved thereby that the page number memory comprises the most recently requested page numbers at any moment. Considering that a user often requests the same pages in case of normal use, this list of most frequently requested pages remains stored in the preferably non-volatile page number memory. The page number entered by the user is implicitly stored in the page number memory, which means that the user need not operate an additional store key. The page corresponding to the number which has been entered is also directly searched by the multipage teletext decoder, and, where possible, displayed immediately. The relevant pages can therefore be accessed without any waiting time, while the user does not have to operate an additional recall key. If the pattern of use changes in the course of time, in other words, if the requested page numbers change, they are automatically stored and after some time the page numbers which are no longer requested ultimately disappear from the memory. Such a receiver is therefore adaptive to the pattern of use.

A further embodiment according to the invention is realised in that in response to generating a page number which has already been stored, the stored identical page number instead of the page number having the oldest order of precedence is removed from the page number memory. It is also possible to adapt the control circuit in such a way that, in response to generating a page number which has already been stored, said page number is not stored but the most recent order of precedence is assigned to the relevant page number which has already been stored, while adapting the orders of precedence of the other page numbers in the page number memory. The page number memory is then used more effectively, because only different page numbers are stored. For the sake of completeness it should therefore be noted that the order of precedence of the stored page numbers does not necessarily absolutely indicate the sequence of generating the page numbers. For example, a page number which has meanwhile been removed may originally have been stored between two page numbers with a consecutive order of precedence.

It has also proved useful to refrain from storing the generated page number, if it was not yet stored in the page number memory, as long as the page corresponding to the page number has not been displayed on the screen for a predetermined period of time. This prevents erroneously entered page numbers and the numbers of nontransmitted pages from being preserved.

If desired, the receiver can be provided with a special recall key in the manner as described in reference [3] so as to successively display the stored preferred pages without any waiting time.

REFERENCES

[1] Teletext device with reduced page-access time. European patent application No. 0,118,950.
[2] Teletext signal processing circuit for a teletext receiver. European patent application No. 0,220,763.
[3] Television receiver comprising a teletext decoding circuit and a page number memory. U.S. Pat. No. 4,701,794.

DESCRIPTION OF EMBODIMENTS

General structure

Figure 1:
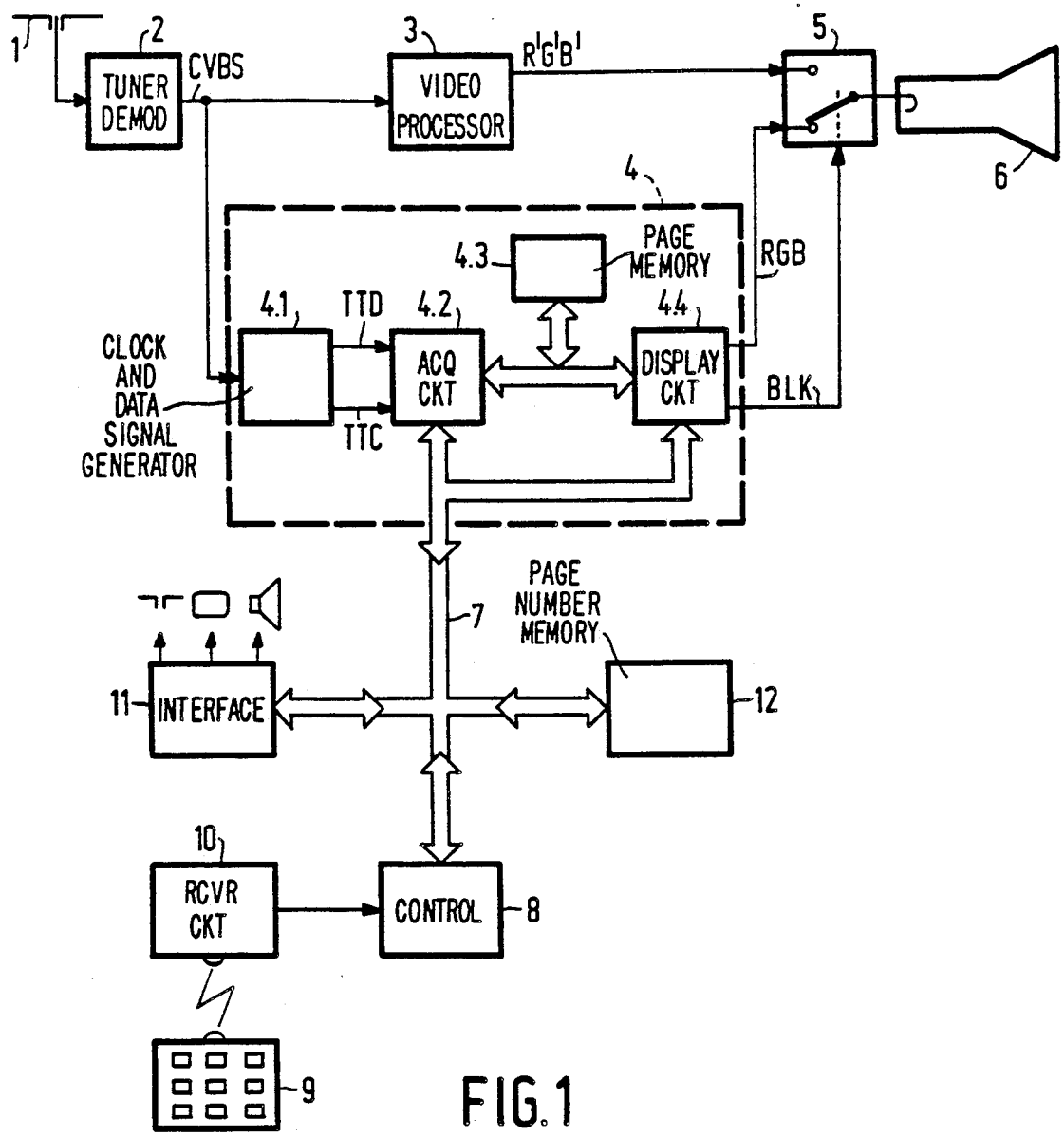
FIG. 1 shows diagrammatically the structure of a television receiver with a multipage teletext decoder.

An embodiment of a television receiver is shown diagrammatically in FIG. 1. The transmitter signals received via an antenna 1 are applied to a conventional tuning and demodulation circuit 2. The obtained composite video signal CVBS of the selected television program is applied on the one hand to a conventional video signal processing circuit 3 and on the other hand to a multipage teletext decoder 4. In the normal operating state of the receiver the elementary colour signals R'G'B' generated by video processing circuit 3 are applied to a display screen 6 via a switch 5 in order that the user can watch the received television program. In a teletext operating state which can be called by the user the elementary colour signals RGB of multipage teletext decoder 4 are displayed on display screen 6 via switch 5.

Multipage teletext decoder 4 comprises a circuit 4.1 which regenerates the digital teletext data signal TTD and the associated clock signal TTC from the applied video signal CVBS, an acquisition circuit 4.2 which captures a number of selected pages in an autonomous manner, a page memory 4.3 in which the captured pages are stored and a display circuit 4.4 which converts a selected stored page into elementary colour signals RGB. Display circuit 4.4 also generates a blanking signal BLK with which switch 5 is operated and with which the display of the normal television program is blanked in the teletext operating state.

Multipage teletext decoder 4 is connected to a control circuit 8 by means of a command bus 7. The multipage teletext decoder receives, inter alia the numbers of the pages to be captured and stored, as well as the number of the page to be displayed, via this command bus of the control circuit.

Operating instructions given by the user are generated in a (remote) control unit 9 and applied to control circuit 8 via a receiver circuit 10. As soon as the user selects the teletext operating state, multipage teletext decoder 4 receives the instruction, via command bus 7 from the control circuit 8, to activate the blanking signal BLK in such a way that the colour signals RGB of the teletext page to be displayed are applied to display screen 6.

An interface 11, which enables control circuit 8 to tune to transmission stations, to control brightness and volume and the like, is also connected to command bus 7. This is indicated by means of the appropriate symbols in the Figure.

Furthermore a preferably non-volatile storage medium 12 is connected to command bus 7 in which control circuit 8 can store all kinds of data which must not get lost when the receiver is switched off, such as tuning data and picture and sound adjustments. More particularly, a portion of this memory is used for storing a number of teletext page numbers. This portion of storage medium 12 will be further referred to as the page number memory.

Figure 2A:
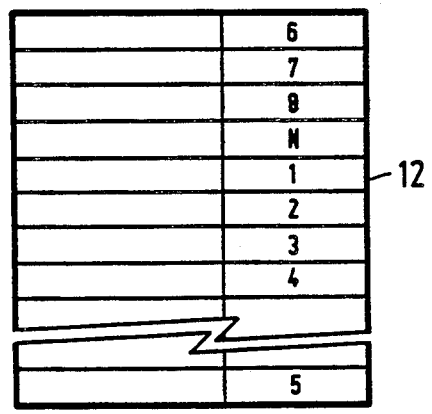
FIG. 2 shows two possible forms of organising the page number memory for storing N page numbers and the orders of precedence assigned thereto.
Figure 2B:
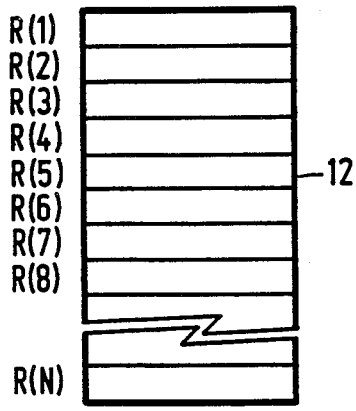

When storing page numbers in page number memory 12 by means of control circuit 8, an order of precedence which is related to the sequence in which they are generated is assigned to the stored page numbers. Two possible forms of organising the memory are shown for this purpose in FIGS. 2a and 2b shows an organogram in which page numbers are stored at random memory addresses and in which a figure indicating the order of precedence is explicitly added to each page number. The page number having the order of precedence 1 is the most recently generated, hence most recent page number and the page number having the order of precedence N is the number which has been stored for the longest time, i.e. it is the oldest number. FIG. 2b shows a series of N registers R(1) to R(N) each comprising a page number, with register R(1) comprising the most recently stored page number and register R(N) comprising the oldest number. The order of precedence of a page number is therefore implicitly determined by the place of the page number in page number memory 12 in this organogram. Both forms are equivalent; if, for example a page number with order of precedence 4 must receive a new order of precedence 5, the order of precedence 4 in the organogram according to FIG. 2a is replaced at the relevant memory address by order of precedence 5, while in the organogram according to FIG. 2b the page number of register R(4) is moved to register R(5). The organogram according to FIG. 2b will be used hereinafter.

Operation of the receiver

The operation of the receiver shown in FIG. 1 is determined by a control program which is stored in the control circuit 8 which is preferably implemented in the form of a microprocessor. After the receiver has been switched on or after a different television program has been tuned to, the control program initially proceeds through the following steps in known manner: the page numbers stored in registers R(1) to R(N) of the page number memory 12, as well as page number 100, are passed on to acquisition circuit 4.2 via command bus 7 whereafter this circuit captures the relevant teletext pages in an autonomous manner and stores them in page memory 4.3. It is thus assumed that the multipage teletext decoder can receive and store at least one page more than the number of page numbers stored in page number memory 12. Page 100 is called because this page generally comprises the main index and should be the first page to be displayed on the display screen in the teletext state. With this part of the control program it is achieved that it is very likely that page 100 and the pages with the page numbers stored in registers R(1) to R(N) have already been found and stored if the user selects the teletext state.

Figure 3:
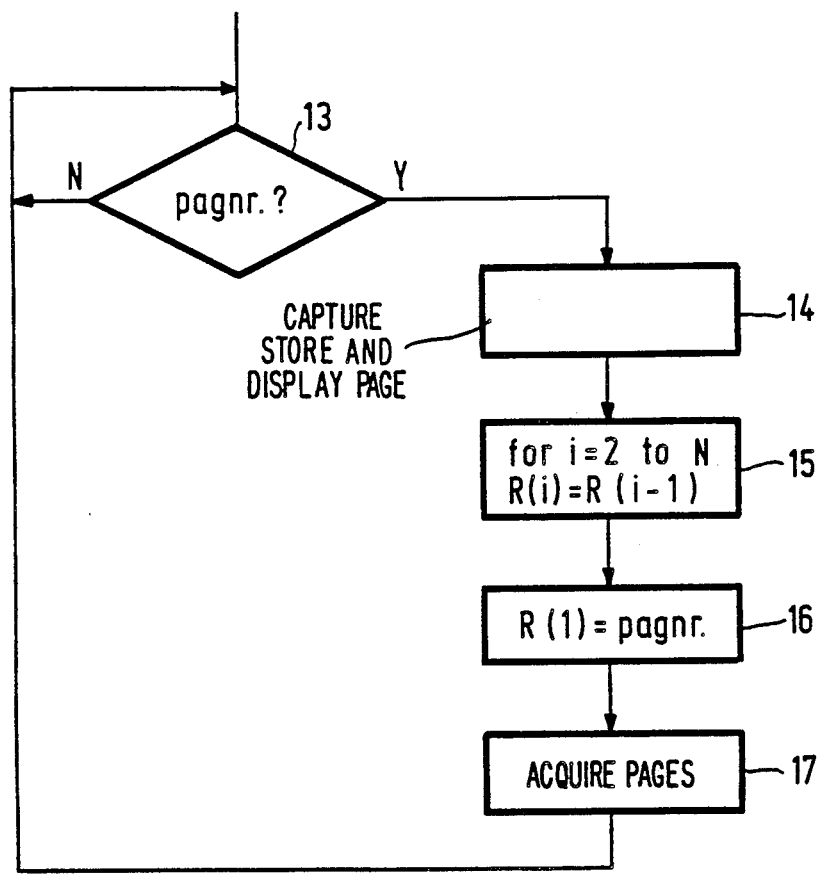
FIGS. 3 to 7 show some diagrams to explain the operation of the television receiver shown in FIG. 1.

The further control program in the teletext state is shown in FIG. 3. In step 13 the control program checks whether the user has entered a page number. As long as this is not the case, the program returns to step 13 and continues to wait for a page number. If a page number has been entered, the multipage teletext decoder is given instructions in known manner in a step 14, such that this decoder captures the page with the entered number, stores it and displays it on the screen. This will often be not immediately possible because the requested page, i.e. the page with the number that has been entered, has not been stored yet so that the user will have to wait until the page is transmitted by the transmitter. However, if the entered number has already been stored in the page number memory, it is very likely that the requested page has already been found and stored. In this case the requested page is displayed immediately.

While the multipage teletext decoder autonomously carries out the instructions obtained in step 14, the control program proceeds through a step 15 in which the orders of precedence assigned to the stored page numbers are adapted by placing the contents of register R(1) in register R(2), the contents of register R(2) in register R(3), and so forth. The original contents of register R(N) then get lost. Subsequently the register R(1) emptied in step 15 is filled in a step 16 with the page number which has been entered, so that the most recent order of precedence is assigned to this page number. Subsequently the modified contents of the page number memory are passed on in a step 17 in known manner to the multipage teletext decoder via the command bus for further acquisition of the pages stated in the page number memory. Then the control program returns to step 13 so as to wait for a new page request by the user.

Figure 4:
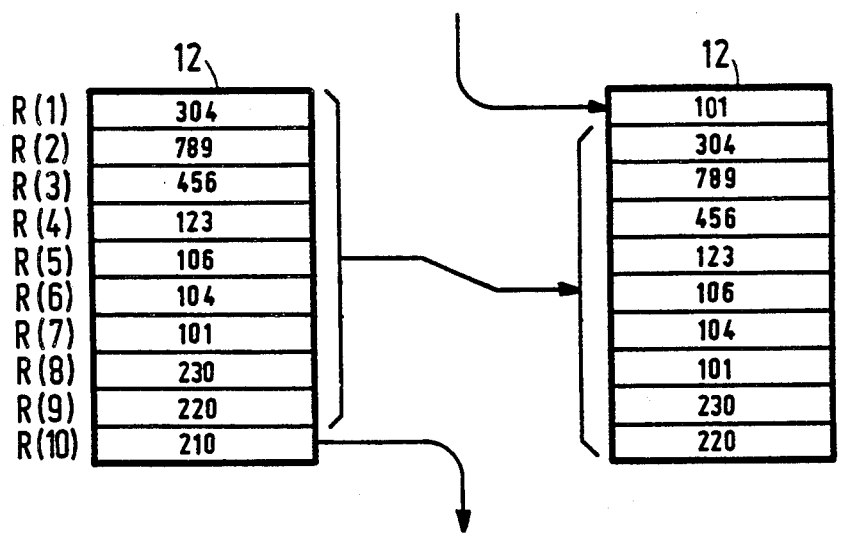

FIG. 4 shows by way of example and for the sake of completeness what happens with the contents of page number memory 12, in this case considered to be suitable for storing 10 page numbers, when running through the control program of FIG. 3. The situation prior to entering a page number by the user has been illustrated at the left and the situation after page 101 has been requested is illustrated at the right. It should be noted that page 101 was already present in the memory, in this case in register R(7), so that the page is very likely to be displayed on the screen without any waiting time after it has been requested.

It may be apparent from the foregoing that an original page number stored in R(1) shifts one position in the page number memory whenever a new page has been requested and ultimately disappears from this memory after N times. The page number memory thus always comprises the numbers of the N most recently requested teletext pages, R(1) comprising the most recently requested, on-screen displayed page and R(N) comprising the oldest page. If a user sufficiently often consults pages having a number which has already been stored, the numbers of these pages will not get lost because they are written in register R(1) again before they disappear from register R(N). The user will then get such a page on the display screen without any waiting time and immediately after he has entered the page number. However, if the pattern of use changes, for example because the user is interested in another subject on pages with different numbers, the new numbers are stored in the page number memory and the old numbers will automatically disappear after some time. The receiver thus provides a waiting time reduction in an adaptive way, which is very pleasant when consulting teletext.

Figure 5:
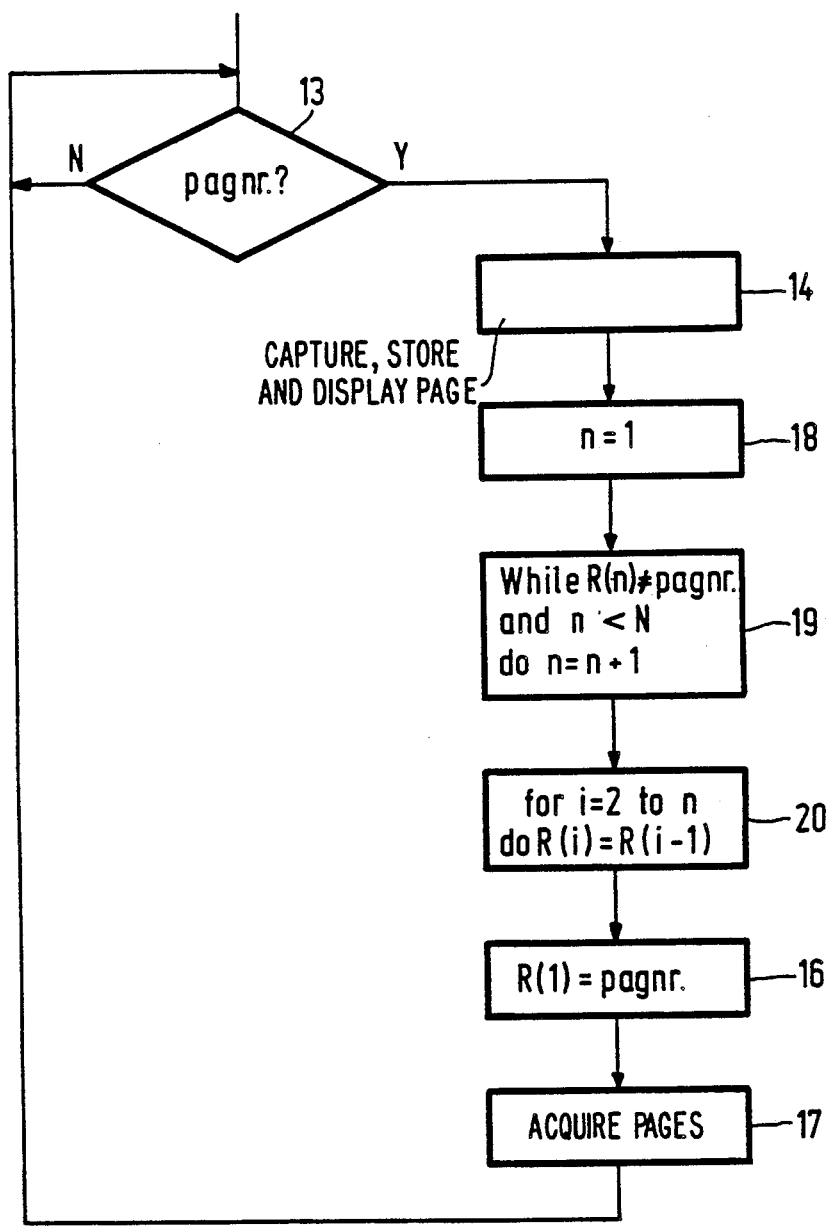

A result of the control program of FIG. 3 is that page numbers will often be stored in the page number memory more than once. In fact, if a page with a page number already stored is requested, the order of precedence of this stored page number is increased, but the page number itself is not removed from the memory as long as it is not the oldest page number. This considerably reduces the possibility of storing as many different page numbers as possible in the page number memory. A more effective use of the page number memory is achieved with a control program as is shown in FIG. 5. This control program only differs from that shown in FIG. 3 in that step 15 is replaced by steps 18 to 20. In a step 18 an auxiliary index n is given the initial value 1. Subsequently page number memory 12 is run through from R(1) in a step 19 and it is checked whether the page number stored therein is identical to the number which has been entered. If this is the case, step 19 is terminated, with R(n) comprising the identical page number. If the entered page number is not found in any one of the registers, step 19 is terminated because auxiliary index n has reached the maximum value N. Subsequently a step 20 is carried out. This step is substantially identical to the previously described step 15 and is used for advancing the page numbers to a subsequent register in the page number memory. Now, however, only the page numbers in registers R(1) to R(n−1) inclusive are advanced one position and the numbers in R(n+1) to R(N) inclusive are not affected. The original contents of register R(n) are lost, as was also intended, because register R(n) comprised the page number which corresponded to the entered page number. In step 16 the entered page number is stored as the most recent page number in register R(1). Thus, the page number memory now comprises different page numbers only.

Figure 6:
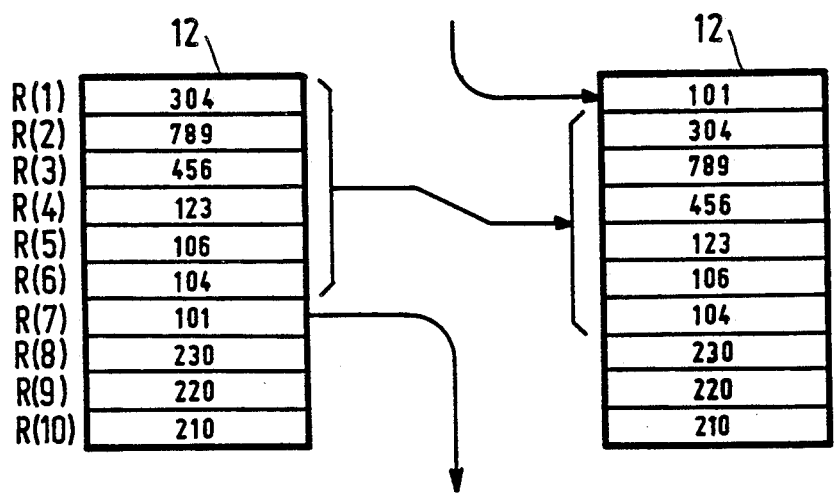

FIG. 6 shows an example of the contents of page number memory 12 before and after storing a new number for this embodiment of the control program. The page number originally stored in register R(7) corresponds to the entered number and for this reason it is removed from the page number memory. The relevant page number 101 is now stored only as the most recent number in register R(1). Page number 210, stored in register R(10), is now preserved and page 210 thus remains accessible without any waiting time.

Figure 7:
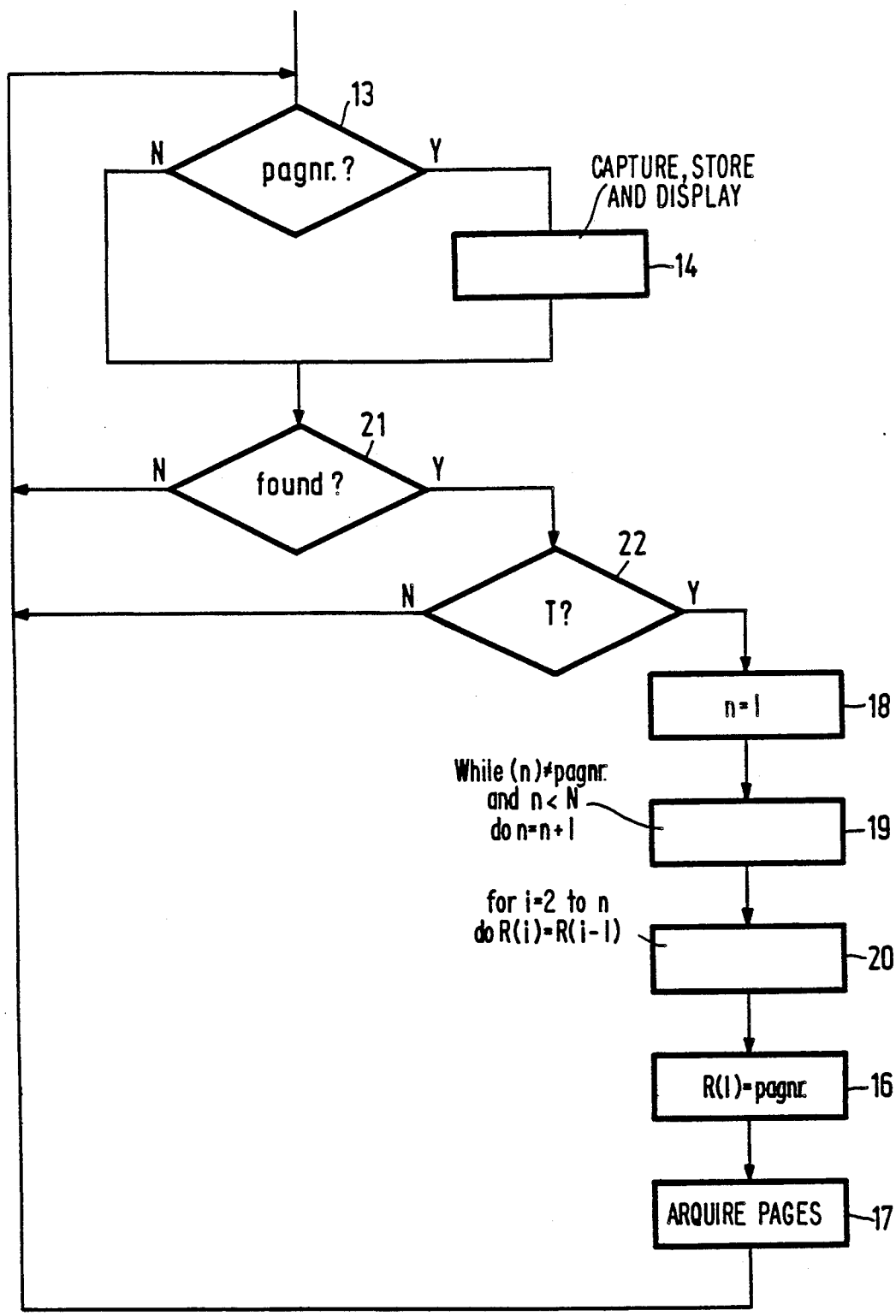

When consulting teletext, it regularly appears that a requested page is not transmitted. Erroneously entered figures for a page number are often corrected by completing the erroneous page number, immediately followed by entering the intended number. It also occurs that after a glance at the display screen the displayed page does not appear to have the envisaged contents. In all these cases page numbers are entered without this leading to a display of actually desired pages on the display screen. It is therefore unnecessary to store these page numbers in the page number memory. As is shown in FIG. 7, the control program has a step 21 for this purpose in which it is checked in known manner whether the page which corresponds to the entered page number has actually been captured and displayed. As long as this is not the case, it remains possible to enter a new page number via step 13. If the page with the entered page number has been found, it is checked in a step 22 also in known manner whether a certain period of time has elapsed since the reception of this page. The orders of precedence of the page numbers are adapted in the previously described manner in steps 18, 19 and 20 only if the page with the entered page number has been displayed at least for a predetermined period of time, while the entered number is stored in step 16 and the adapted page numbers are applied in step 17 to the multipage teletext decoder for further acquisition. For the sake of completeness it is to be noted that the adjusted period of time during which a page should at least be displayed may also be zero.

What is claimed is:

1. A receiver for television and teletext signals, comprising:
   an operating system for generating a page number of a teletext page desired by a user;
   a teletext decoder having a first input for receiving the teletext signals, a second input for receiving page numbers of teletext pages, and a picture signal output, said decoder being adapted to search and store the teletext pages corresponding to the received page numbers;
   a page number memory for storing at least two page numbers;
   a control circuit coupled to the page number memory, the operating system and the teletext decoder and being adapted to apply the page numbers stored in the page number memory and page numbers generated by the operating system to the teletext decoder, to select for display the teletext page having the page number generated by the operating system, and to store page numbers generated by the operating system in the page number memory; and
   a display screen, coupled to the picture signal output of the teletext decoder, for displaying the teletext page selected for display; said control circuit including means for assigning an order of precedence to the page numbers in the page number memory, which order of precedence is related to the sequence in which these page numbers are generated by the operating system.

2. A receiver for television and teletext signals as claimed in claim 1, characterized in that the means for assigning includes means for assigning the most recent order of precedence to a page number generated by the operating system when this page number is stored in the page number memory, and means for reassigning the orders of precedence of the other page numbers in the page number memory.

3. A receiver for television and teletext signals as claimed in claim 2, characterized in that the means for assigning includes means for removing a page number having an older order of precedence from the page number memory when a page number generated by the operating system is stored in said memory.

4. A receiver for television and teletext signals as claimed in claim 3, characterized in that in the case of a full page number memory said means for assigning includes means for removing from the page number memory the page number having the oldest order of precedence.

5. A receiver for television and teletext signals as claimed in claim 3, characterized in that the means for assigning includes means for removing the page number which is identical to the page number to be stored in the page number memory.

6. A receiver for television and teletext signals as claimed in claim 1, characterized in that, in response to generating a page number which is identical to a page number stored in the page number memory, the means for assigning includes means for refraining from storing the generated page number and to assign the most recent order of precedence to that page number corresponding to the page number which has already been stored, while reassigning the orders of precedence of the other page numbers in the page number memory.

7. A receiver for television and teletext signals as claimed in claim 1, characterized in that, in response to generating a page number which is not yet stored in the page number memory, the control circuit includes means for refraining from storing the generated page number as long as the teletext page corresponding to said page number has not been displayed on the screen for a predetermined period of time.

8. A receiver of television and teletext signals as claimed in claim 1, characterized in that the operating system further includes means for generating an operating instruction for successively displaying the pages corresponding to the page numbers stored in the page number memory on the display screen.

9. A receiver for television and teletext signals as claimed in claim 2, characterized in that, in response to generating a page number which is not yet stored in the page number memory, the control circuit includes means for refraining from storing the generated page number as long as the teletext page corresponding to said page number has not been displayed on the screen for a predetermined period of time.

10. A receiver for television and teletext signals as claimed in claim 3, characterized in that, in response to generating a page number which is not yet stored in the page number memory, the control circuit includes means for refraining from storing the generated page number as long as the teletext page corresponding to said page number has not been displayed on the screen for a predetermined period of time.

11. A receiver for television and teletext signals as claimed in claim 4, characterized in that, in response to generating a page number which is not yet stored in the page number memory, the control circuit includes means for refraining from storing the generated page number as long as the teletext page corresponding to said page number has not been displayed on the screen for a predetermined period of time.

12. A receiver for television and teletext signals as claimed in claim 5, characterized in that, in response to generating a page number which is not yet stored in the page number memory, the control circuit includes means for refraining from storing the generated page number as long as the teletext page corresponding to said page number has not been displayed on the screen for a predetermined period of time.

13. A receiver for television and teletext signals as claimed in claim 6, characterized in that, in response to generating a page number which is not yet stored in the page number memory, the control circuit includes means for refraining from storing the generated page number as long as the teletext page corresponding to said page number has not been displayed on the screen for a predetermined period of time.

14. A receiver of television and teletext signals as claimed in claim 2, characterized in that the operating system further includes means for generating an operating instruction for successively displaying the pages corresponding to the page numbers in the page number memory on the display screen.

15. A receiver of television and teletext signals as claimed in claim 3, characterized in that the operating system further includes means for generating an operating instruction for successively displaying the pages corresponding to the page numbers in the page number memory on the display screen.

16. A receiver of television and teletext signals as claimed in claim 4, characterized in that the operating system further includes means for generating an operating instruction for successively displaying the pages corresponding to the page numbers in the page number memory on the display screen.

17. A receiver of television and teletext signals as claimed in claim 5, characterized in that the operating system further includes means for generating an operating instruction for successively displaying the pages corresponding to the page numbers in the page number memory on the display screen.

18. A receiver of television and teletext signals as claimed in claim 6, characterized in that the operating system further includes means for generating an operating instruction for successively displaying the pages corresponding to the page numbers in the page number memory on the display screen.

19. A receiver of television and teletext signals as claimed in claim 7, characterized in that the operating system further includes means for generating an operating instruction for successively displaying the pages corresponding to the page numbers in the page number memory on the display screen.

20. A receiver of television and teletext signals as claimed in claim 13, characterized in that the operating system further includes means for generating an operating instruction for successively displaying the pages corresponding to the page numbers in the page number memory on the display screen.

* * * * *